United States Patent
Endo

(10) Patent No.: US 7,426,047 B2
(45) Date of Patent: Sep. 16, 2008

(54) ELECTRONIC DEVICE AND CONTROL METHOD THEREOF

(75) Inventor: Hiroyuki Endo, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 1103 days.

(21) Appl. No.: 10/231,250

(22) Filed: Aug. 30, 2002

(65) Prior Publication Data

US 2003/0053111 A1    Mar. 20, 2003

(30) Foreign Application Priority Data

Aug. 31, 2001  (JP)  ............................. 2001-264054
Jul. 25, 2002  (JP)  ............................. 2002-216175

(51) Int. Cl.
G06K 15/00   (2006.01)
H04B 7/00    (2006.01)

(52) U.S. Cl. ..................... 358/1.14; 455/507

(58) Field of Classification Search ............... 358/1.14, 358/1.18, 434, 437–439; 455/507, 574, 343, 455/3.06; 713/20, 300; 379/102.04, 100, 379/100.01, 100.05; 709/208; 704/233; 340/825.72

See application file for complete search history.

(56) References Cited

U.S. PATENT DOCUMENTS

2005/0179935 A1 *   8/2005   Ogura et al.   ............... 358/1.14

* cited by examiner

*Primary Examiner*—Saeid Ebrahimi Dehkordy
(74) *Attorney, Agent, or Firm*—Oblon, Spivak, McClelland, Maier & Neustadt, P.C.

(57) ABSTRACT

In the energy saving mode, a card I/F circuit section is controlled to turn ON intermittently for a predetermined interval by using a switch. The I/F circuit section supplies electric power to an outside I/F part during the ON interval, and receives some communication data from the outside. When the communication data received by the I/F circuit section is a request for a return from the energy saving mode, a return to the ordinary mode is effected. Therefore, an I/F part, such as a non-contact IC card, requiring external electric power supply can be used as a factor of a request for a return from the energy saving mode. In addition, the energy consumption for that purpose can be reduced.

45 Claims, 7 Drawing Sheets

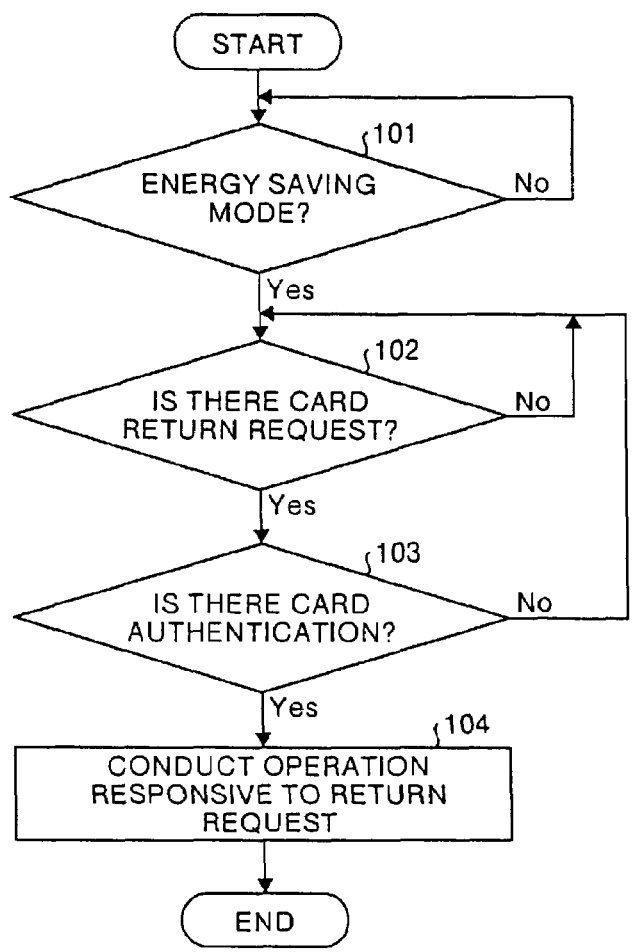
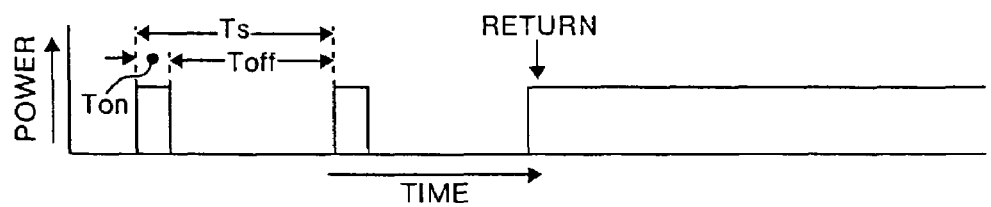
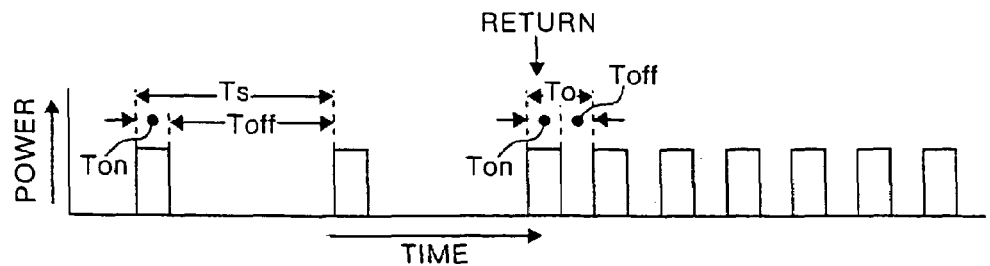

ELECTRONIC DEVICE AND CONTROL METHOD THEREOF

BACKGROUND OF THE INVENTION

1) Field of the Invention

The present invention relates to an electronic device, such as a facsimile device or a copying device, having an energy saving mode, and control method thereof.

2) Description of the Prior Art

In an electronic device, such as a facsimile device or a copying device, it is frequently conducted to provide an energy saving mode in order to reduce power consumption when the electronic device is not used. In the energy saving mode, electric power is supplied to only a minimum number of components required for a return to an ordinary mode and supply of electric power to other components is stopped.

If a request for a return to the ordinary operation is issued to an electronic device assuming the energy saving mode by using any of various sensors or key operation, then the return request is detected and a return from the energy saving mode to the ordinary mode is effected to supply electric power to respective components of the electronic device.

In recent years, there is developed an electronic device in which a request for a return to the ordinary mode from the energy saving mode is issued from a non-contact IC card. In order to attain interface (hereafter abbreviated to I/F) with the non-contact IC card, an I/F circuit is provided in a main body of the electronic device. Furthermore, if the non-contact IC card is a card that needs an external power supply, then it is necessary to supply electric power from the I/F circuit of the electronic device main body.

Since electric power is supplied from the I/F circuit of the electronic device main body to the non-contact IC card in the non-contact state by using, for example, electromagnetic induction, however, great power is consumed. This results in a problem that energy consumed at the time of the energy saving mode cannot be sufficiently suppressed. If reduction of the energy consumption is given priority, the non-contact IC card cannot be used as a factor of a request for a return from the energy saving mode, resulting in a problem.

SUMMARY OF THE INVENTION

It is an object of the present invention to provide an electronic device, such as a facsimile device, a copying device, a PDA, or a computer, having an energy saving mode that makes it possible to use an I/F part, such as a non-contact IC card, requiring external electric power supply as a factor of a request for a return from the energy saving mode and reduce the energy consumption for that purpose.

According to one aspect of the invention, there is provided an electronic device having an energy saving mode, comprising: an energy saving controller that controls an ordinary mode and the energy saving mode, an I/F circuit section controlled by the energy saving controller, that supplies electric power to outside in an non-contact manner, and that receives communication data from the outside, and a switch controlled by the energy saving controller and that supplies electric power from a main power supply to the I/F circuit section, wherein in energy saving mode, the switch is controlled to turn ON intermittently during a predetermined interval, and the I/F circuit section supplies electric power to the outside during the ON interval, and receives communication data from the outside.

According to another aspect of the invention, there is provided an electronic device having an energy saving mode, comprising: an energy saving controller that controls an ordinary mode and the energy saving mode, an I/F circuit section that includes an electric power supply circuit in order to supply electric power to outside in a non-contact manner and a data communication circuit in order to receive communication data from the outside, and that is controlled by the energy saving controller, and a switch controlled by the energy saving controller and that supplies electric power from a main power supply to the electric power supply circuit, wherein in energy saving mode, the switch is controlled to turn ON intermittently during a predetermined interval, and the I/F circuit section receives communication data from the outside, and supplies electric power to the outside during the ON interval.

According to still another aspect of the invention, there is provided an electronic device having an energy saving mode, comprising: an energy saving controller that controls an ordinary mode and the energy saving mode, an I/F circuit section controlled by the energy saving controller, that supplies electric power to outside in an non-contact manner, and that at least receives communication data from the outside, and a switch controlled by the energy saving controller and that supplies electric power from a main power supply to the I/F circuit section, wherein in energy saving mode, the switch is controlled to turn ON intermittently during a predetermined interval, and the I/F circuit section supplies electric power to the outside during the ON interval, and receives at least a part of some communication data from the outside, and when the I/F circuit section has received at least a part of some communication data, the energy saving controller conducts ON control on the switch so as to increase an average of electric power supplied to the outside, and determines whether the communication data is a request for a return from the energy saving mode.

According to still another aspect of the invention, there is provided an electronic device having an energy saving mode, comprising: an energy saving controller that controls an ordinary mode and the energy saving mode, an I/F circuit section that includes an electric power supply circuit in order to supply electric power to outside in a non-contact manner and a data communication circuit in order to receive communication data from the outside, and that is controlled by the energy saving controller, and a switch controlled by the energy saving controller and that supplies electric power from a main power supply to the electric power supply circuit, wherein in energy saving mode, the switch is controlled to turn ON intermittently during a predetermined interval, and the I/F circuit section receives at least a part of some communication data from the outside, and supplies electric power to the outside during the ON interval, and when the I/F circuit section has received at least a part of some communication data, the energy saving controller conducts ON control on the switch so as to increase an average of electric power supplied to the outside, and determines whether the communication data is a request for a return from the energy saving mode.

These and other objects, features and advantages of the present invention are specifically set forth in or will become apparent from the following detailed descriptions of the invention when read in conjunction with the accompanying drawings.

BRIEF DESCRIPTION OF THE DRAWINGS

FIG. 4 is a flow chart which shows operation of a first embodiment according to the present invention, FIG. 5 is a diagram which shows a first mode of electric power supply to outside conducted at time of a return to an ordinary mode, FIG. 6 is a diagram which shows a second mode of electric power supply to outside conducted at time of a return to an ordinary mode.

DETAILED DESCRIPTION

The present invention can be applied widely to electronic devices, such as facsimile devices, copying devices, PDAs and computers, having an energy saving mode. Hereafter, embodiments of the present invention by taking a facsimile device as an example with reference to the drawings.

Figure 1:
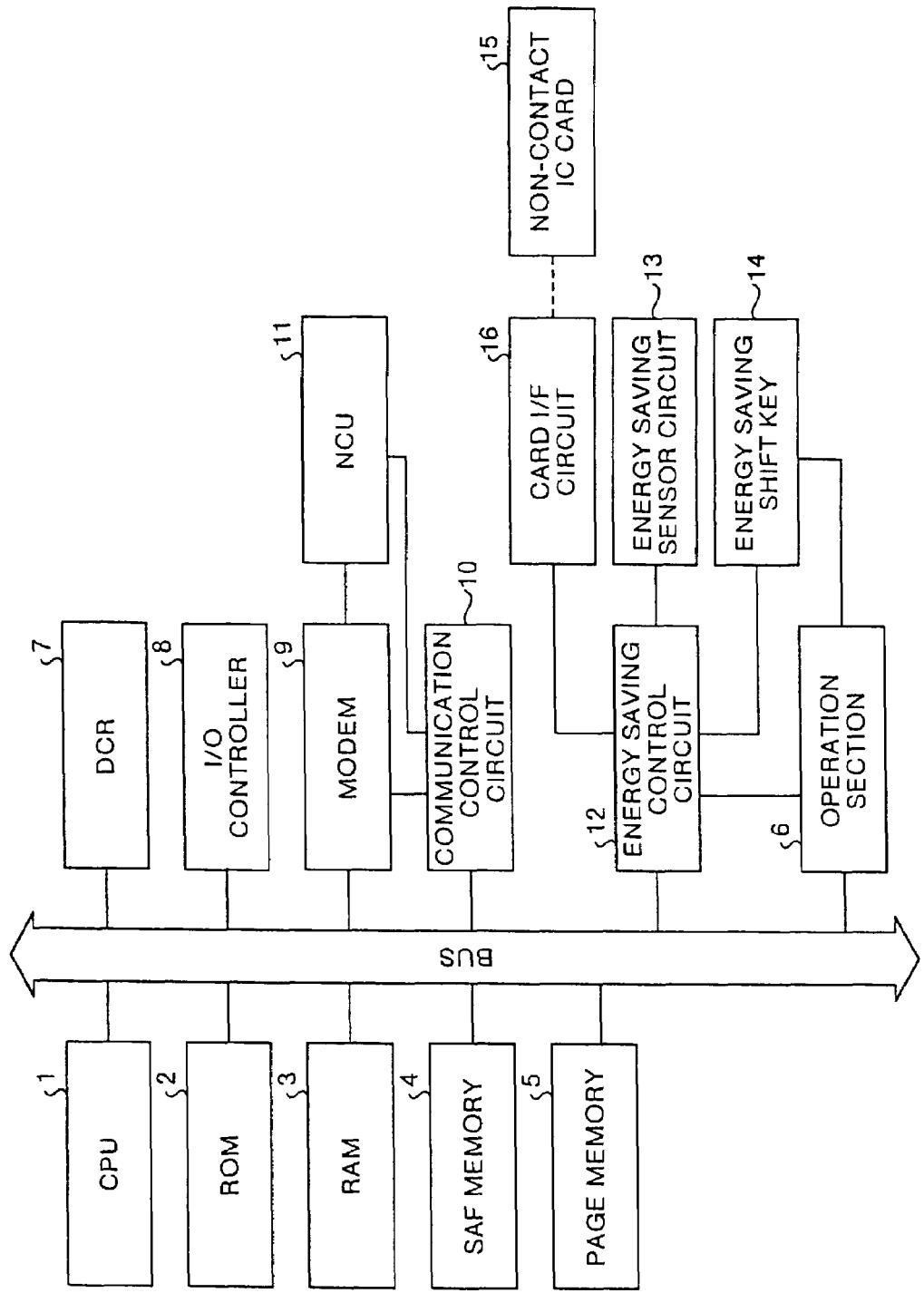
FIG. 1 is a block diagram which shows a general configuration of a facsimile device according to the present invention.

FIG. 1 is a block diagram which shows a general configuration of a facsimile device according to the present invention.

In FIG. 1, a CPU 1 functions to control of the whole facsimile device. A ROM 2 stores a processing program to be executed by the CPU 1, and data required executing the processing program. A RAM 3 forms a work area of the CPU 1, and stores information of the facsimile device. As image memories, there are provided an SAF memory 4 and a page memory 5. The SAF memory 4 serves as a compressed data memory. The page memory 5 serves as a buffer of printing raw data. On an operation section 6, an operator operates the present facsimile device. A DCR 7 conducts compression of transmission data and expansion of received data. An I/O controller 8 conducts the whole of I/O control of the present facsimile device. A modem 9 and a communication controller 10 conducts control that concerns facsimile communication. Conversion to line data and transmission and reception are converted by an NCU (network control unit) 11.

Control of an energy saving mode is conducted by an energy saving control circuit 12. At the time of energy saving mode, the CPU 1 turns OFF electric power supply except the energy saving control circuit 12 and a circuit concerning the energy saving control circuit 12. In the energy saving mode, the CPU 1 operates in a low power consumption state.

In response to a return request supplied from an energy saving sensor circuit 13, an energy saving shift key 14, or a non-contact IC card 15, the energy saving control circuit 12 cancels the energy saving mode, and causes a return to operation of an ordinary mode.

A return to the ordinary mode in response to such a return request maybe conducted in response to a single return request, or may be conducted in response to a combination of a plurality of return requests, such as a combination of a return request from the energy saving shift key 14 and a return request from the non-contact IC card 15.

When an owner having the non-contact IC card 15 has approached the pertinent facsimile device main body, the non-contact IC card 15 issues a request for a return from the energy saving mode to a card I/F circuit 16 controlled by the energy saving control circuit 12.

The card I/F circuit 16 includes an electric power supply circuit and a data communication circuit (i.e. a transmission and reception circuit). The electric power supply circuit supplies electric power to the outside non-contact IC card 15 by electromagnetic induction in a non-contact manner. The data communication circuit conducts communication with the outside non-contact IC card 15.

The non-contact IC card 15 is a representative example of an I/F part that needs an outside power supply. The non-contact IC card 15 is supplied with a power supply from the card I/F circuit 16 in a non-contact manner, and the non-contact IC card 15 conducts data transmission and reception with the card I/F circuit 16. At least, the non-contact IC card 15 transmits communication data, such as the fact that the IC card 15 is a non-contact IC card and an authenticated code.

Figure 2:
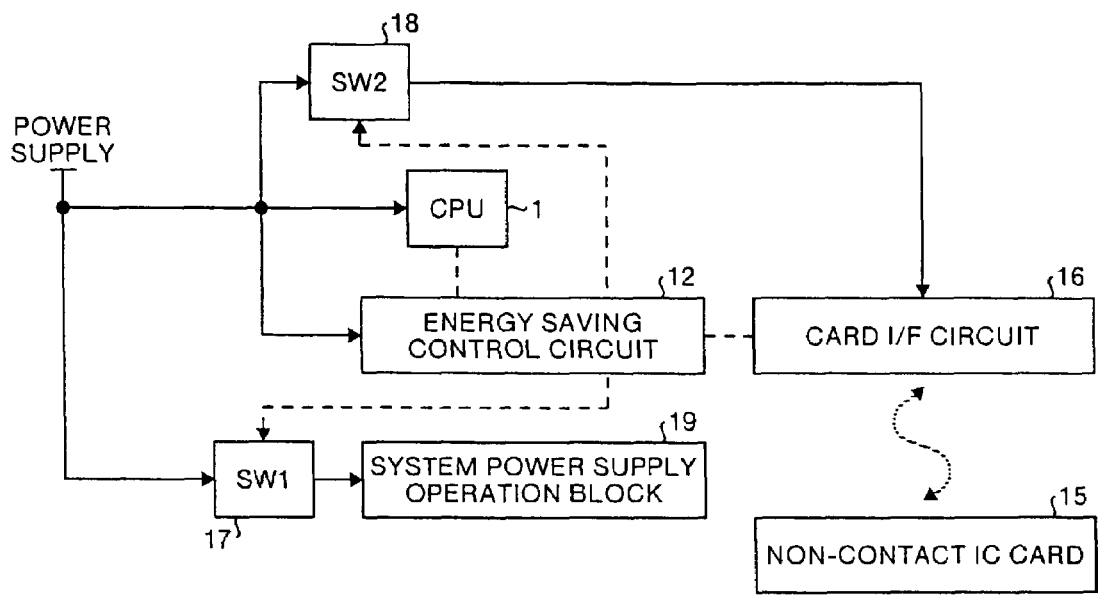
FIG. 2 is a block diagram which shows a configuration concerning energy saving of a facsimile device according to the present invention.

FIG. 2 is a block diagram which shows a configuration especially concerning energy saving of a facsimile device according to the present invention. Electric power from the facsimile device main body is supplied as it is to components that are supplied with electric power at the time of energy saving mode, such as the CPU 1 and the energy saving control circuit 12.

Electric power is supplied to the card I/F circuit 16 via a second switch 18. At the time of the ordinary mode, the second switch 18 remains ON, and electric power is supplied continuously. At the time of the energy saving mode,the second switch 18 is turned ON and OFF intermittently. Only during an ON interval of the second switch 18, electric power is supplied. By thus conducting electric power supply using the electromagnetic induction from the card I/F circuit 16 to the outside only intermittently, the energy consumption at the time of energy saving mode is reduced.

Other components (denoted by system power supply operation block 19 in FIG. 2) are supplied with electric power via a first switch 17. At the time of energy saving mode, the first switch 17 is turned OFF and consequently electric power supply is also stopped. The power supply control is executed by the energy saving control circuit 12 via the CPU 1.

The card I/F circuit 16 supplies electric power to the non-contact IC card 15 by electromagnetic induction in a non-contact manner. At the time of the energy saving mode, electric power is supplied to the card I/F circuit intermittently, and consequently electric power is supplied to the non-contact IC card 15 as well intermittently.

Therefore, I/F access of the non-access IC card 15 to the card I/F circuit 16 becomes possible intermittently only during the ON interval in which electric power is supplied. Therefore, it is necessary to conduct processing operation of a return from the energy saving mode by communication during power supply ON interval.

Figure 3:
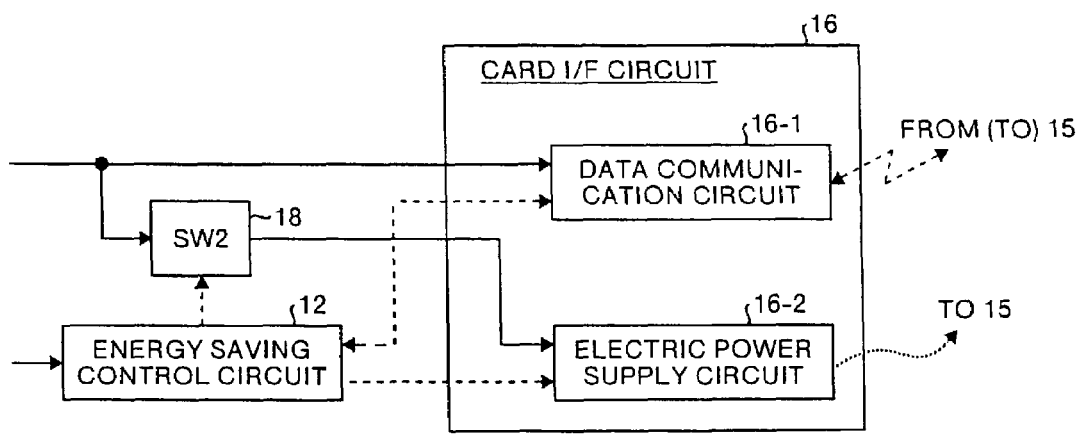
FIG. 3 is a diagram which shows another configuration example of a card I/F circuit.

FIG. 3 is a diagram which shows another configuration example of the card I/F circuit 16. For the purpose of explanation, the card I/F circuit 16 is shown together with the second switch 18 and the energy saving control circuit 12.

The card I/F circuit 16 has a data communication circuit 16-1 and an electric power supply circuit 16-2. In FIG. 3, a circuit supplied with electric power intermittently by the second switch 18 is the electric power supply circuit 16-2. The data communication circuit is always supplied with electric power from the main power supply.

Power consumption of the data communication circuit 16-1 is considerably lower than that of the electric power supply circuit 16-2. Therefore, it does not pose a great problem in energy saving to always supply electric power to the data communication circuit 16-1.

On the other hand, the non-contact IC card 15 uses the power supplied by the electromagnetic induction from the electric power supply circuit 16-2, typically by rectifying and smoothing it by means of diodes and a capacitor. Therefore, an interval during which the non-contact IC card 15 can conduct I/F access to the data communication circuit 16-1 becomes a little longer than a power supply ON interval during which electric power is supplied to the electric power supply circuit 16-2. Therefore, the card I/F circuit 16 can conduct communication with the energy saving control circuit 12 during an interval that is a little longer than the power supply ON interval.

Embodiments of the present invention will be explained one after another.

FIG. 4 is a flow chart which shows operation of a first embodiment according to the present invention. In the first embodiment, the power supply ON interval of the second switch 18, which is turned ON at the time of energy saving mode, is set to be long enough to exchange communication data between the non-contact IC card 15 and the card I/F circuit 16.

Upon start in FIG. 4, it is first determined at step 101 whether the facsimile device is in the energy saving mode. If the facsimile device is in the energy saving mode, then the processing proceeds to step 102 to determine whether a return request signal from the non-contact IC card 15 is detected by the card I/F circuit 16.

If a return request signal is detected, then the processing proceeds to step 103 to determine base on a code contained in the received communication data whether the non-contact IC card 15 that has transmitted the return request signal is an IC card authenticated by the facsimile device.

If the IC card is a card that is not authenticated, then the energy saving mode is continued without giving a change in appearance to the facsimile device, and the processing returns to the step 102 to determine whether a return request signal is detected.

If the IC card is an authenticated card, then the processing proceeds to step 104 to conduct return processing in response to a return request, return from the energy saving mode to the ordinary mode, and start device operation to the user who has presented the card.

If it doesn't matter whether the IC card 15 is an authenticated card or unauthenticated card, then the card authentication at the step 103 can be omitted.

In decision of the return request signal in the first embodiment shown in FIG. 4, the power supply ON interval is set to a time that is long enough to communicate data between the non-contact IC card 15 and the card I/F circuit 16. Therefore, it is possible to detect a return request signal sent from the non-contact IC card 15 certainly without a necessity of considering the intermittent operation of the power supply. Further, since its power supply is turned ON intermittently with an arbitrarily set OFF interval between, the energy consumption can be reduced.

In the first embodiment shown in FIG. 1, various modes can be adopted as the operation of the second switch conducted when a return to the ordinary mode from the energy saving mode, i.e., as a mode of electric power supply to the outside. Those modes are shown in FIGS. 5 to 10.

With reference to FIG. 5, the second switch 18 intermittently operates in the energy saving mode with a period Ts, an ON interval Ton and an OFF interval Toff. When a return to the ordinary mode is effected in response to authentication of the non-contact IC card, the second switch 18 is turned ON and thereafter continuously in the ON state.

In FIG. 6, after are turn to the ordinary mode is effected, an OFF interval Toff of the second switch 18 is made shorter than before and an ON interval Ton is made unchanged. As a result, the period To becomes shorter. Therefore, an ON-OFF duty ratio Ton/To becomes greater than that in the energy saving mode.

Figure 7:
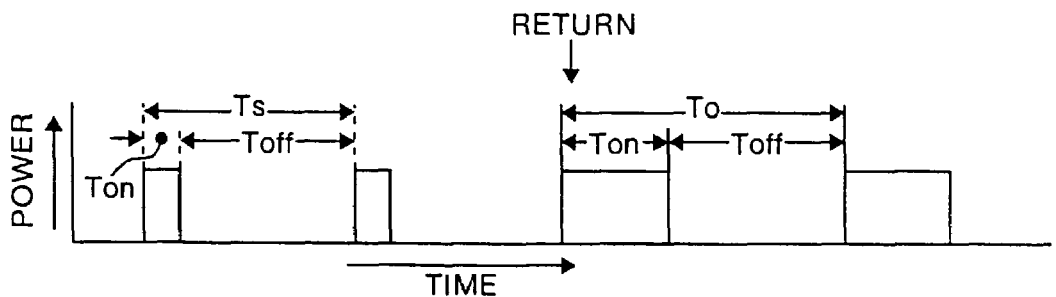
FIG. 7 is a diagram which shows a third mode of electric power supply to outside conducted at time of a return to an ordinary mode.

In FIG. 7, after are turn to the ordinary mode is effected, an ON interval Ton of the second switch 18 is made longer than before and an OFF interval Toff is made unchanged. As a result, the period To becomes longer. Therefore, an ON-OFF duty ratio Ton/To becomes greater than that in the energy saving mode likewise.

Figure 8:
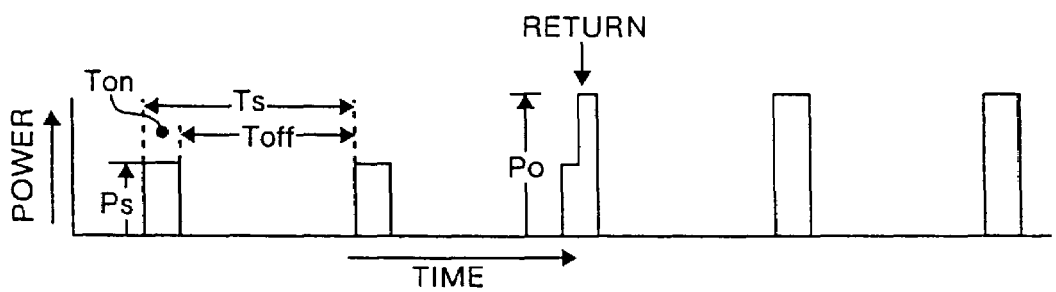
FIG. 8 is a diagram which shows a fourth mode of electric power supply to outside conducted at time of a return to an ordinary mode.

With reference to FIG. 8, the second switch 18 intermittently operates in the energy saving mode, with a period Ts, an ON interval Ton, an OFF interval Toff, and electric power Ps of the ON interval. When a return to the ordinary mode is effected, electric power Po supplied to the outside is made greater (Po>Ps) by operation of the second switch 18. Although the ON-OFF duty ratio remains unchanged, therefore, average supplied electric power becomes greater.

In order to change the supplied electric power, the second switch 18 has a configuration with a voltage adjustment circuit (such as a series regulator or a switching regulator) added thereto. The second switch 18 with a voltage adjustment circuit added thereto is turned ON or OFF. At the time of ON, the setting value of the output voltage of the voltage adjustment circuit in the energy saving mode is made different from that in the ordinary mode. As the voltage adjustment circuit, it is desirable to use a switching regulator having less loss in order to enhance the energy saving effect.

The voltage adjustment circuit may be separated from the second switch 18, and disposed in the electric power supply circuit 16-2. In this case, the energy saving control circuit 12 supplies a control signal to the second switch 18 in order to turn ON or OFF the second switch 18, and a setting value of an output voltage is supplied to the voltage adjustment circuit of the electric power supply circuit 16-2. Since a constant voltage is supplied to the data communication circuit in this case, data transmission and reception can be conducted stably.

According to the operation of the second switch 18 shown in FIGS. 5 to 8, electric power supplied to the outside becomes greater in average value when a return to the ordinary mode is effected as compared with the preceding energy saving mode. Among the operations of the second switch 18 shown in FIGS. 5 to 8, a combination of two or more kinds may also be executed. The ON interval, OFF interval and electric power value may also be adjusted so as to make the average value of the electric power supplied to the outside great immediately after a return to the ordinary mode from the energy saving mode and make the average value gradually smaller with the elapse of time.

As a result, communication data can be received from the non-contact IC card more certainly. Even if the owner of the IC card moves to some extent around the facsimile device, therefore, the communication data does not cease and consequently stable device operation can be anticipated.

Figure 9:
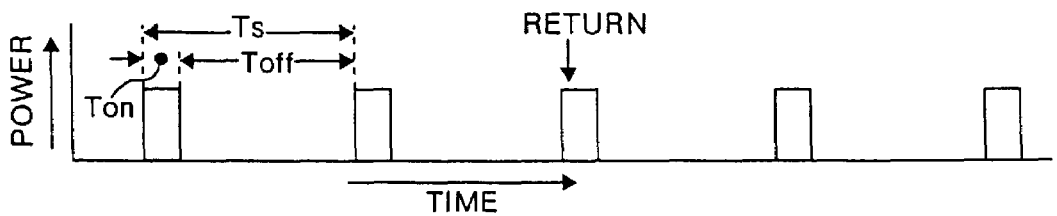
FIG. 9 is a diagram which shows a fifth mode of electric power supply to outside conducted at time of a return to an ordinary mode.

After a return to the ordinary mode is effected in the same way as FIG. 5, non-contact electric power supply to the outside is kept in the same state as before in FIG. 9. Since in this case the second switch 18 can conduct the same operation, its control is simple. In order make the facsimile device stably, however, it is desirable to set a timer operation of predetermined time in a shift from the ordinary mode to the energy saving mode once a return to the ordinary mode is effected.

Figure 10:
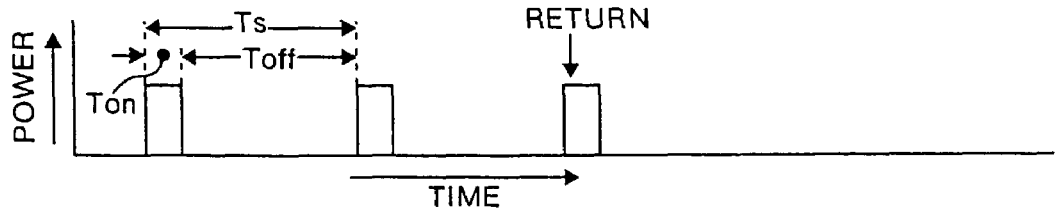
FIG. 10 is a diagram which shows a sixth mode of electric power supply to outside conducted at time of a return to an ordinary mode.

After a return to the ordinary mode is effected in the same way as FIG. 5, the second switch 18 is kept in the OFF state continuously in FIG. 10 and electric power supply to the outside is not conducted. When a series of operations of the facsimile device after the return has finished or when any device operation is not conducted, a shift to the energy saving mode is effected in this case.

Figure 11:
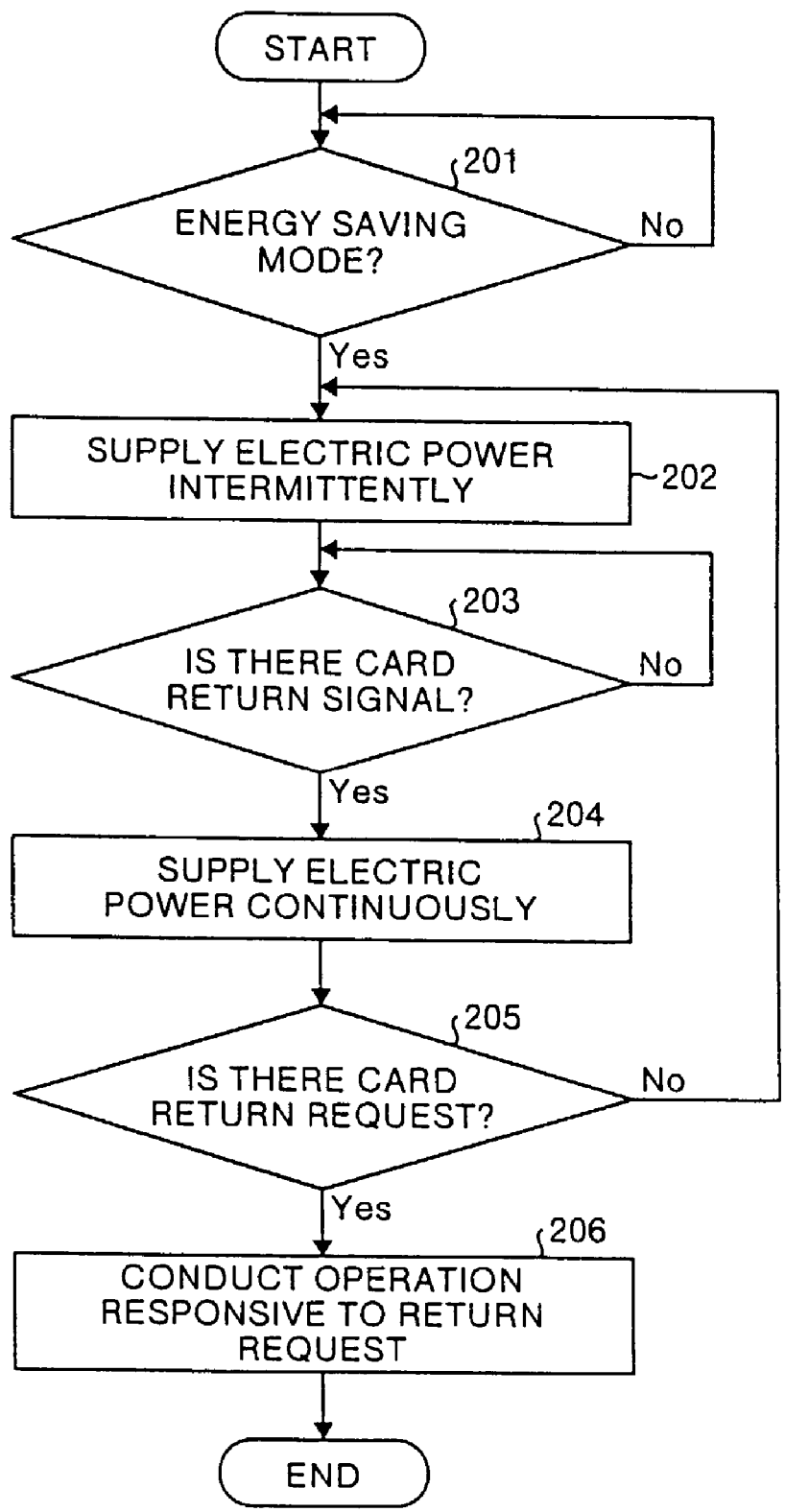
FIG. 11 is a flow chart which shows operation of a second embodiment according to the present invention.
Figure 12:
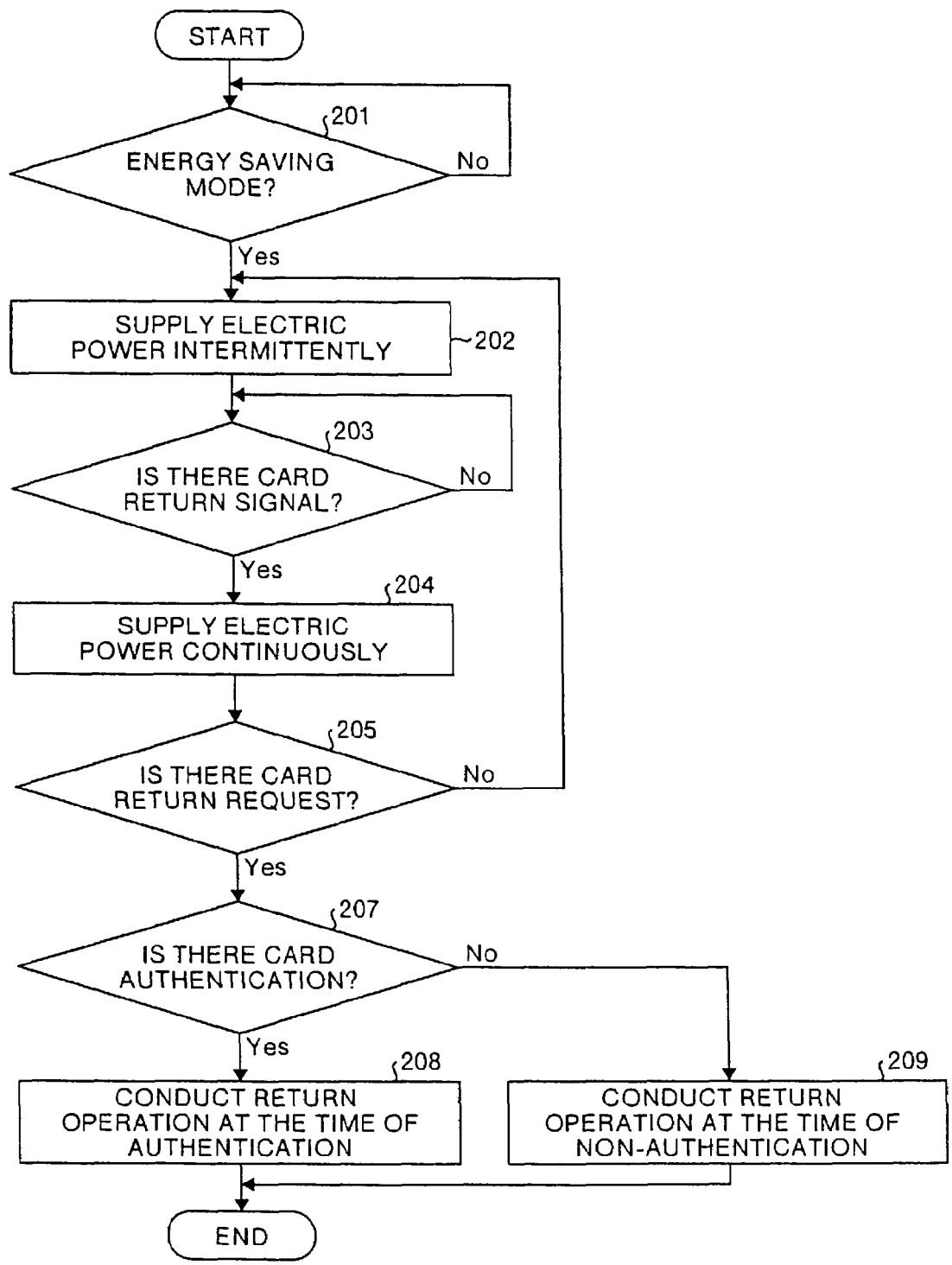
FIG. 12 is a flow chart which shows operation of a third embodiment according to the present invention.
Figure 13:
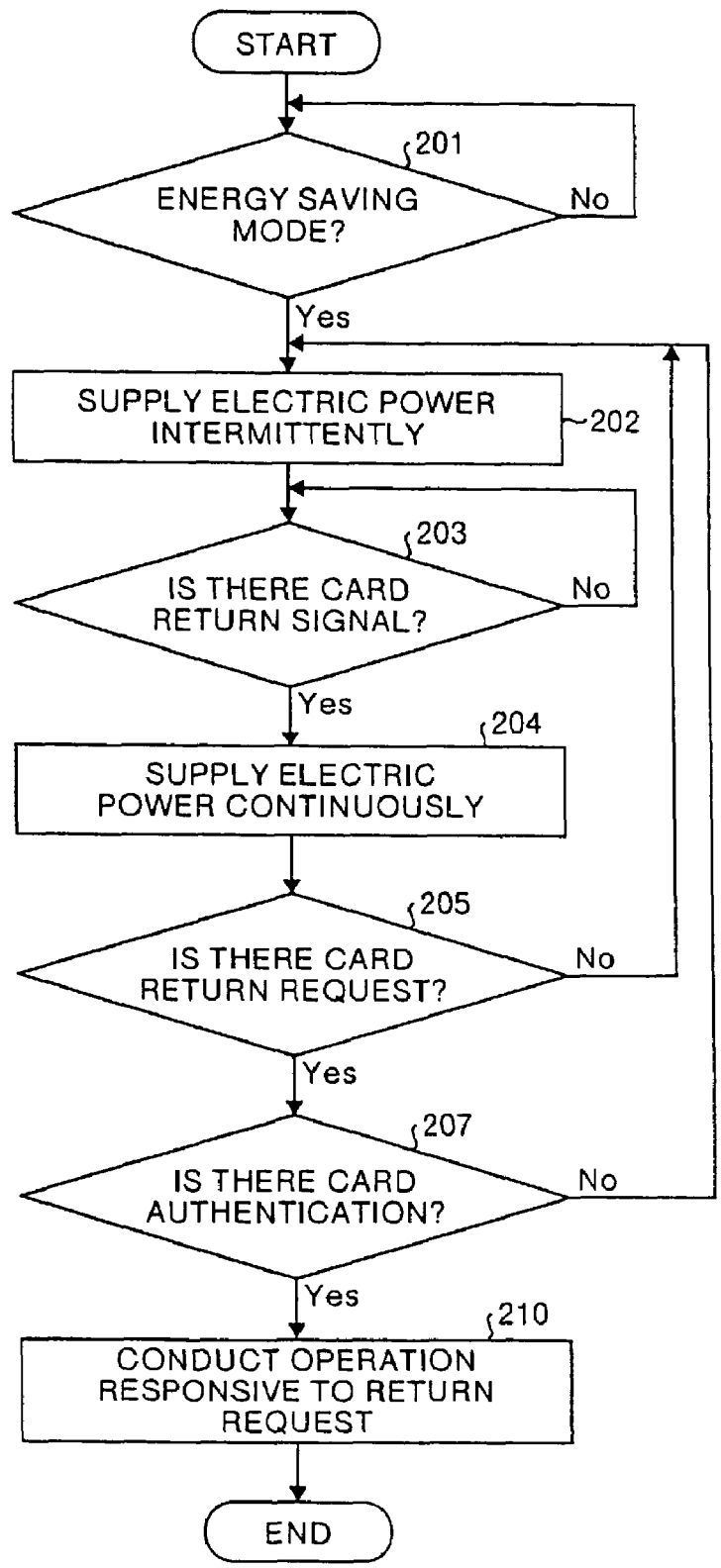
FIG. 13 is a flow chart which shows operation of a fourth embodiment according to the present invention.

Second to fourth embodiments of the present invention will now be explained with reference to FIGS. 11 to 13 showing flow charts. In these embodiments, the power supply ON interval of the second switch 18 that is intermittently turned ON in the energy saving mode is made short to further advance the energy saving. Since the power supply ON interval is set to be short, communication data cannot be exchanged in some cases between the non-contact IC card 15 and the card I/F circuit 16 in a complete form in the power supply ON interval. These embodiments are formed so as to cope with such a case.

A second embodiment shown in FIG. 11 will now be explained. Upon start, it is determined at step 201 whether the facsimile device is in the energy saving mode. If the facsimile device is in the energy saving mode, electric power supply to the card I/F circuit 16 is conducted intermittently as shown in step 202. The electric power supply ON interval is set to be short in order to further decrease the power consumption in the energy saving mode.

In the electric power supply ON interval, it is not necessary to exchange communication data in a complete form between the non-contact IC card 15 and the card I/F circuit 16, but it is sufficient that at least a part of the communication data can be detected. In other words, the ON interval needs only be long enough to be able to sense some data access. For example, the ON interval may have such a length as to be able to only one bit located at the beginning of communication data. On the other hand, the power supply OFF interval can be set arbitrarily. For example, the power supply OFF interval can be determined by taking the reduction of the power consumption and answer delay time allowed when the non-contact IC card has approached into account.

The processing proceeds to step 203 to determine whether a card return signal is detected. The card return signal is not a card return request signal based on communication data in a complete form, but is at least a part of the communication data. Namely, the card return signal means some data.

If it is judged that some data (i.e., the card return signal) is detected, then the processing proceeds to step 204. There is a possibility that the detected data is communication data supplied from the non-contact IC card, i.e., a card return request signal. Therefore, the second switch 18 that operates intermittently is turned ON and kept in the ON state continuously. Temporarily, electric power is thus supplied to the card I/F circuit 16.

The continuous electric power supply is conducted in the same way as FIG. 5. However, the continuous electric power supply is conducted for a predetermined time needed to detect communication data in a complete form supplied from the non-contact IC card 15. The "return" in FIG. 5 should be read as "data detection."

The method of operating the second switch so as to increase the average electric power as shown in FIGS. 6, 7 and 8 instead of the temporary continuous electric power supply can also be adopted in the same way as the adoption shown in FIG. 5. This point can be applied to the ensuing embodiments as well in the same way.

By the temporary continuous electric power supply and/or the temporary electric power supply with increased average electric power, it becomes possible in the card I/F circuit 16 to detect a card return request signal based on communication data in a complete form supplied from the non-contact IC card 15.

The processing proceeds to step 205. The card I/F circuit 16 conducts communication with the non-contact IC card 15, acquires communication data in a complete form, and determines based on a result of the communication whether a card return request signal is detected.

If the card return request signal has not been detected, then the card return signal detected at the step 203 is attributable to false detection. Therefore, the processing returns to the step 202, where the second switch 18 operates intermittently in the energy saving mode again and electric power supply to the card I/F 16 is conducted intermittently. In addition, detection of a card return signal is conducted at the step 203.

If a card return request signal is detected, then the processing proceeds to step 206 and a predetermined return operation responsive to the return request is conducted.

In the second embodiment, the mode shown in FIG. 5 or FIG. 10 explained with reference to the first embodiment can be adopted as the operation of the second switch 18 conducted when a return from the energy saving mode to the ordinary mode is effected. Since the actions and effects of these modes are explained, repeated explanation will be omitted. This point can be applied to the ensuing embodiments as well in the same way.

Since in the second embodiment shown in FIG. 11 the electric power supply ON interval of the second switch 18 that is intermittently turned ON in the energy saving mode, the electric power consumption in the energy saving mode can be further reduced. If any data is received during the shortened electric power supply ON interval, then temporarily electric power is supplied to the card I/F section 16 continuously or with increased average electric power. Therefore, it can be determined certainly whether there is a return request signal from the non-contact IC card.

In a third embodiment shown in FIG. 12, a processing flow between steps 201 and 205 is the same as that shown in FIG. 11. In the third embodiment shown in FIG. 12, a card authentication step 207 is provided after the decision as to whether there is a card return request (the step 205), in order to conduct card authentication. At the card authentication step 207, it is determined based on a code contained in received communication data whether the non-contact IC card 15 that has issued the card return request signal is an authenticated card or an unauthenticated card.

If the non-contact IC card 15 that has issued the card return request signal is an authenticated card, then the processing proceeds to step 208 and a return processing operation at the time of authentication is conducted in response to the return request. In other words, a return from the energy saving mode to the ordinary operation mode is effected, and an operation of the device for the IC card presenting user is started.

If the non-contact IC card 15 that has issued the card return request signal is an unauthenticated card, then the processing proceeds to step 209 and a return operation at the time of non-authentication is conducted. As the return operation at the time of non-authentication, for example, an indication to the effect that the IC card is an unauthenticated card is presented to the IC card presenting user and operation of the facsimile device is disabled. In this case, the energy saving mode is continued.

In the third embodiment shown in FIG. 12, the card I/F circuit 16 further determines when a return request signal is detected whether the IC card 15 is an authenticated card and orders operations of the operation section and other sections. Therefore, the user I/F can be improved.

In a fourth embodiment shown in FIG. 13, a processing flow between steps 201 and 205 is likewise the same as that of FIG. 11. In the fourth embodiment shown in FIG. 13, a card authentication step 207 is provided after the decision as to whether there is a card return request (the step 205), in order to determine based on a code contained in received communication data whether the non-contact IC card 15 that has issued the card return request signal is an authenticated card or an unauthenticated card.

If the non-contact IC card 15 that has issued the card return request signal is an unauthenticated card, then the energy saving mode is continued without giving a change on appearance to the facsimile device, and the processing returns to step 202. At the step 202, the second switch conducts intermittent operation in the energy saving mode, and electric power supply to the card I/F 16 is conducted intermittently. In addition, detection of a card return signal is conducted at the step 203.

If the non-contact IC card 15 that has issued the card return request signal is an authenticated card, then the processing proceeds to step 210 and a return processing operation at the time of authentication is conducted in response to the return request. A return from the energy saving mode to the ordinary operation mode is effected, and an operation of the device for the IC card presenting user is started.

In the fourth embodiment shown in FIG. 13, the card I/F circuit 16 further determines when a return request signal is detected whether the IC card 15 is an authenticated card. If the non-contact IC card 15 is an authenticated card, then an operation of the device for the IC card presenting user is started. If the non-contact IC card 15 is an unauthenticated card, then the energy saving mode is continued without giving any change on appearance to the facsimile device.

It is also possible to transmit data using the facsimile device and/or other data to the non-contact IC card 15 and store such data in the non-contact IC card 15, by providing the data communication circuit in the card I/F circuit 16 with such a form as to be able to conduct transmission and reception.

It is also possible to supply small electric power continuously in the energy saving mode and supply large electric power continuously when are turn to the ordinary mode is effected, by using the method of controlling the magnitude of the supplied electric power as shown in FIG. 8.

According to the electronic device in the present embodiments, the electric power supply ON interval is set to be long enough to exchange communication data between an I/F part, such as a non-contact IC card, requiring an external electric power supply and an I/F circuit section of a device main body, in decision as to a return request signal. Therefore, detection of a return request signal can be conducted certainly without the necessity of considering the intermittent operation of the electric power supply. Since the electric power supply is turned ON intermittently with an arbitrarily set OFF interval between, the energy consumption can be reduced. Since electric power is always supplied from the main power supply to the data communication circuit, communication with the energy saving control circuit 12 becomes possible during an interval that is a little longer than the electric power supply ON interval.

According to the electronic device in the present embodiments, a return from the energy saving mode is effected in response to only an authenticated I/F part, whereas with respect to an unauthenticated I/F part, the electronic device does not respond it and continues the energy saving mode without giving any change on appearance to the unauthenticated I/F part. As a result, it is possible to use an authenticated I/F part in the energy saving mode as well.

According to the electronic device in the present embodiments, the electric power consumption in the energy saving mode can be further reduced by making the electric power supply ON interval turned ON intermittently in the energy saving mode shorter. If any data is received in the shortened electric power supply ON interval, electric power temporarily increased in average value is supplied to the I/F circuit section of the device main body. Therefore, it is possible to determine certainly whether there is a return request signal from an I/F part, such as a non-contact IC card, requiring an external power supply. Since electric power is always supplied from the main power supply to the data communication circuit, communication with the energy saving control circuit 12 becomes possible for an interval that is a little longer than the electric power supply ON interval.

According to the electronic device in the present embodiments, the average value of the electric power supplied to the outside is increased by changing the intermittent supply state in the energy saving mode to a continuous supply state, a supply state shortened in OFF time, a supply state lengthened in ON time, or a supply state increased in electric power at the time of ON operation. According to the electronic device and its use form, therefore, a suitable electric power supply method can be adopted.

According to the electronic device in the present embodiments, the I/F circuit section of the device main body determines, upon detection of a return request signal, whether an I/F part, such as its IC card, requiring external power supply is an authenticated part and orders operation of an operation section or the like. Therefore, the user I/F can be improved.

According to the electronic device in the present embodiments, the I/F circuit section of the device main body determines, upon detection of a return request signal, whether an I/F part, such as its IC card, requiring external power supply is an authenticated part. If the I/F part is an authenticated IC card, then operation of the device for the card presenting user is started. If the I/F part is an unauthenticated IC card, then the energy saving mode is continued without giving any change on appearance to the electronic device. In the energy saving mode as well, therefore, it becomes possible to use the card.

According to the electronic device in the present embodiments, non-contact electric power supply to the outside is changed, upon a return to the ordinary mode, from an intermittent supply state in the energy saving mode to a continuous supply state, a supply state shortened in OFF time, a supply state lengthened in ON time, a supply state increased in electric power at the time of ON operation, the same state as the intermittent supply state in the energy saving mode, or a state in which non-contact electric power supply to the outside is OFF. According to the electronic device and its use form, therefore, a suitable electric power supply method can be adopted.

The present document incorporates by reference the entire contents of Japanese priority document, 2001-264054 filed in Japan on Aug. 31, 2001 and 2002-216175 filed in Japan on Jul. 25, 2002.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An electronic device having an energy saving mode, comprising:
an energy saving controller configured to switch between an ordinary mode and the energy saving mode;
an I/F circuit section controlled by the energy saving controller, configured to supply electric power to an outside device in a non-contact manner, and configured to receive communication data from the outside device; and
a switch controlled by the energy saving controller, and configured to supply electric power from a main power supply to the I/F circuit section,
wherein in the energy saving mode, the switch is configured to turn ON intermittently during a predetermined interval, and the I/F circuit section supplies electric power to the outside device in the non-contact manner during the ON interval, and receives at least a portion of the communication data from the outside device, and
when the I/F circuit section has received at least the portion of the communication data and only one bit is detected, located at a beginning of the communication data which is not in a complete form, the energy saving controller switches from a continuous electric power supply to an intermittent power supply of an ON control which is conducted for a predetermined time needed to detect the communication data in the complete form, and determines whether the communication data includes a request for a return from the energy saving mode, and
wherein the ON control increases an average of electric power in the intermittent supply state by applying an increased electric power at time of the ON control.

2. The electronic device according to claim 1, wherein the ON control that increases the average of electric power is a change from a intermittent supply state to a continuous supply state.

3. The electronic device according to claim 1, wherein the ON control that increases the average of electric power is a change from a intermittent supply state to a supply state with a decreased OFF time.

4. The electronic device according to claim 1, wherein the ON control that increases the average of electric power is a change from a intermittent supply state to a supply state with an increased ON time.

5. The electronic device according to claim 1, wherein the energy saving controller increases an average of electric power supplied to the outside device with an ON control by operating the switch.

6. An having an energy saving mode, comprising:
an energy saving controller configured to switch between an ordinary mode and the energy saving mode;
an I/F circuit section controlled by the energy saving controller, configured to supply electric power to an outside device in a non-contact manner, and configured to receive communication data from the outside device; and
a switch controlled by the energy saving controller, and configured to supply electric power from a main power supply to the I/F circuit section,
wherein in the energy saving mode, the switch is configured to turn ON intermittently during a predetermined interval, and the I/F circuit section supplies electric power to the outside device in the non-contact manner during the ON interval, and receives at least a portion of the communication data from the outside device, and
when after the I/F circuit section has received at least the portion of the communication data, the energy saving controller increases an average of electric power supplied to the outside device with an ON control by operating the switch, and determines whether the communication data includes a request for a return from the energy saving mode;
wherein when the communication data includes a request for a return from the energy saving mode and includes an authenticated code, the energy saving controller is configured to switch to the ordinary mode, and when the communication data does not include an authenticated code, the energy saving controller acknowledges non-authentication without causing a return to the ordinary mode, and
wherein the ON control that increases the average of electric power is a change from a intermittent supply state to a supply state with an increased electric power at time of the ON control.

7. The electronic device according to claim 6, wherein at the time of a return to the ordinary mode, the non-contact electric power supply to the outside device is changed to a continuous supply state.

8. The electronic device according to claim 6, wherein at the time of a return to the ordinary mode, the non-contact electric power supply to the outside device is changed to a supply state with a decreased OFF time compared to the intermittent supply state in the energy saving mode.

9. The electronic device according to claim 6, wherein at the time of a return to the ordinary mode, the non-contact electric power supply to the outside device is changed to a supply state with an increased ON time compared to the intermittent supply state in the energy saving mode.

10. The electronic device according to claim 6, wherein at the time of a return to the ordinary mode, the non-contact electric power supply to the outside device is changed to a supply state with an increased electric power at time of ON operation compared to the intermittent supply state in the energy saving mode.

11. The electronic device according to claim 6, wherein at the time of a return to the ordinary mode, the non-contact electric power supply to the outside device is conducted in the same state as the intermittent supply state in the energy saving mode.

12. The electronic device according to claim 6, wherein at the time of a return to the ordinary mode, the non-contact electric power supply to the outside device is turned OFF.

13. An electronic device having an energy saving mode, comprising:
an energy saving controller configured to switch between an ordinary mode and the energy saving mode;
an I/F circuit section controlled by the energy saving controller, configured to supply electric power to an outside device in a non-contact manner, and configured to receive communication data from the outside device; and a switch controlled by the energy saving controller, and configured to supply electric power from a main power supply to the I/F circuit section, wherein in the energy saving mode, the switch is configured to turn ON intermittently during a predetermined interval, and the I/F circuit section supplies electric power to the outside device in the non-contact manner during the ON interval, and receives at least a portion of the communication data from the outside device, and when after the I/F circuit section has received at least the portion of the communication data, the energy saving controller increases an average of electric power supplied to the outside device with an ON control by operating the switch, and determines whether the communication data includes a request for a return from the energy saving mode, wherein when the communication data includes a request for a return from the energy saving mode and includes an authenticated code, the energy saving controller switches to the ordinary mode, and when the communication data does not include an authenticated code, the energy saving controller switches to the energy saving mode in which the switch is controlled to intermittently turn ON during a predetermined period, and wherein the ON control that increases the average of electric power is a change from a intermittent supply state to a supply state with an increased electric power at time of the ON control.

14. The electronic device according to claim 13, wherein at the time of a return to the ordinary mode, the non-contact electric power supply to the outside device is changed to a continuous supply state.

15. The electronic device according to claim 13, wherein at the time of a return to the ordinary mode, the non-contact electric power supply to the outside device is changed to a supply state with a decreased OFF time compared to the intermittent supply state in the energy saving mode.

16. The electronic device according to claim 13, wherein at the time of a return to the ordinary mode, the non-contact electric power supply to the outside device is changed to a supply state with an increased ON time compared to the intermittent supply state in the energy saving mode.

17. The electronic device according to claim 13, wherein at the time of a return to the ordinary mode, the non-contact electric power supply to the outside device is changed to a supply state with an increased electric power at time of ON operation compared to the intermittent supply state in the energy saving mode.

18. The electronic device according to claim 13, wherein at the time of a return to the ordinary mode, the non-contact electric power supply to the outside device is conducted in the same state as the intermittent supply state in the energy saving mode.

19. The electronic device according to claim 13, wherein at the time of a return to the ordinary mode, the non-contact electric power supply to the outside device is turned OFF.

20. The electronic device according to claim 13, wherein at the time of a return to the ordinary mode, the non-contact electric power supply to the outside device is turned OFF.

21. An electronic device having an energy saving mode, comprising:

an energy saving controller configured to control an ordinary mode and the energy saving mode;

an I/F circuit section that includes an electric power supply circuit configured to supply electric power to an outside device in a non-contact manner and a data communication circuit configured to receive communication data from the outside device, the data communication circuit controlled by the energy saving controller; and a switch controlled by the energy saving controller, and configured to supply electric power from a main power supply to the electric power supply circuit, wherein in the energy saving mode, the switch is controlled to turn ON intermittently during a predetermined interval, and the I/F circuit section receives at least a portion of the communication data from the outside device, and supplies electric power to the outside device during the ON interval, and when the I/F circuit section has received at least a portion of the communication data and only one bit is detected, located at a beginning of the communication data which is not in a complete form, the energy saving controller switches from a continuous electric power supply to an intermittent power supply of an ON control which is conducted for a predetermined time needed to detect the communication data in the complete form, and determines whether the communication data includes a request for a return from the energy saving mode, wherein the ON control increases an average of electric power in the intermittent supply state by applying an increased electric power at time of the ON control.

22. The electronic device according to claim 21, wherein the ON control that increases the average of electric power is a change from a intermittent supply state to a supply state with a decreased OFF time.

23. The electronic device according to claim 21, wherein the ON control that increases the average of electric power is a change from a intermittent supply state to a supply state with an increased ON time.

24. The electronic device according to claim 21, wherein the ON control that increases the average of electric power is a change from a intermittent supply state to a supply state with an increased electric power at time of ON operation.

25. An electronic device having an energy saving mode, comprising:

an energy saving controller configured to control an ordinary mode and the energy saving mode;

an I/F circuit section that includes an electric power supply circuit configured to supply electric power to an outside device in a non-contact manner and a data communication circuit configured to receive communication data from the outside device, the data communication circuit controlled by the energy saving controller; and a switch controlled by the energy saving controller, and configured to supply electric power from a main power supply to the electric power supply circuit, wherein in the energy saving mode, the switch is controlled to turn ON intermittently during a predetermined interval, and the I/F circuit section receives at least a portion of the communication data from the outside device, and supplies electric power to the outside device during the ON interval, and when after the I/F circuit section has received at least a portion of the communication data, the energy saving controller conducts ON control on the switch so as to increase an average of electric power supplied to the outside device, and determines whether the communication data includes a request for a return from the energy saving mode, wherein when the communication data includes a request for a return from the energy saving mode and includes an authenticated code, the energy saving controller switches to the ordinary mode, and when the communication data does not include an authenticated code, the energy saving controller acknowledges non-authentication without causing a return to the ordinary mode, and wherein the ON control that increases the average of electric power is a change from a intermittent supply state to a supply state with an increased electric power at time of the ON control.

26. The electronic device according to claim 25, wherein at the time of a return to the ordinary mode, the non-contact electric power supply to the outside device is changed to a continuous supply state.

27. The electronic device according to claim 25, wherein at the time of a return to the ordinary mode, the non-contact electric power supply to the outside device is changed to a supply state with a decreased OFF time compared to the intermittent supply state in the energy saving mode.

28. The electronic device according to claim 25, wherein at the time of a return to the ordinary mode, the non-contact electric power supply to the outside device is changed to a supply state with an increased ON time compared to the intermittent supply state in the energy saving mode.

29. The electronic device according to claim 25, wherein at the time of a return to the ordinary mode, the non-contact electric power supply to the outside device is changed to a supply state with an increased electric power at time of ON operation compared to the intermittent supply state in the energy saving mode.

30. The electronic device according to claim 25, wherein at the time of a return to the ordinary mode, the non-contact electric power supply to the outside device is conducted in the same state as the intermittent supply state in the energy saving mode.

31. The electronic device according to claim 25, wherein at the time of a return to the ordinary mode, the non-contact electric power supply to the outside device is turned OFF.

32. An electronic device having an energy saving mode, comprising:

an energy saving controller configured to control an ordinary mode and the energy saving mode;

an I/F circuit section that includes an electric power supply circuit configured to supply electric power to an outside device in a non-contact manner and a data communication circuit configured to receive communication data from the outside device, the data communication circuit controlled by the energy saving controller; and a switch controlled by the energy saving controller, and configured to supply electric power from a main power supply to the electric power supply circuit, wherein in the energy saving mode, the switch is controlled to turn ON intermittently during a predetermined interval, and the I/F circuit section receives at least a portion of the communication data from the outside device, and supplies electric power to the outside device during the ON interval, and when after the I/F circuit section has received at least a portion of the communication data, the energy saving controller conducts ON control on the switch so as to increase an average of electric power supplied to the outside device, and determines whether the communication data includes a request for a return from the energy saving mode, wherein when the communication data includes a request for a return from the energy saving mode and includes an authenticated code, the energy saving controller switches to the ordinary mode, and when the communication data does not include an authenticated code, the energy saving controller switches to the energy saving mode in which the switch is controlled to intermittently turn ON during a predetermined period, and wherein the ON control that increases the average of electric power is a change from a intermittent supply state to a supply state with an increased electric power at time of the ON control.

33. The electronic device according to claim 32, wherein at the time of a return to the ordinary mode, the non-contact electric power supply to the outside device is changed to a continuous supply state.

34. The electronic device according to claim 32, wherein at the time of a return to the ordinary mode, the non-contact electric power supply to the outside device is changed to a supply state with a decreased OFF time compared to the intermittent supply state in the energy saving mode.

35. The electronic device according to claim 32, wherein at the time of a return to the ordinary mode, the non-contact electric power supply to the outside device is changed to a supply state with an increased ON time compared to the intermittent supply state in the energy saving mode.

36. The electronic device according to claim 32, wherein at the time of a return to the ordinary mode, the non-contact electric power supply to the outside device is changed to a supply state with an increased electric power at time of ON operation compared to the intermittent supply state in the energy saving mode.

37. The electronic device according to claim 32, wherein at the time of a return to the ordinary mode, the non-contact electric power supply to the outside device is conducted in the same state as the intermittent supply state in the energy saving mode.

38. An electronic device having an energy saving mode, comprising:

a mode setting means for setting any one of an ordinary mode and the energy saving mode;

an I/F means controlled by the mode setting means for supplying electric power to an outside device in a non-contact manner and for receiving communication data from the outside device; and a switching means controlled by the mode controlled means for supplying electric power from a main power supply to the I/F means, wherein when the mode setting means has set the energy saving mode, the mode setting means controls the switching means to be ON intermittently during a predetermined interval, and controls the I/F means to supply electric power to the outside device in the non-contact manner, when the switching means is ON and to receive the communication data from the outside device, when the I/F means has received at least the portion of the communication data and only one bit is detected, located at a beginning of the communication data which is not in a complete form, the mode setting means switches from a continuous electric power supply to an intermittent power supply of an ON control which is conducted for a predetermined time needed to detect the communication data in the complete form, and determines whether the communication data includes a request for a return from the energy saving mode, and wherein the ON control increases an average of electric power in the intermittent supply state by applying an increased electric power at time of the ON control.

39. An electronic device having an energy saving mode, comprising:

a mode setting means for setting any one of an ordinary mode and the energy saving mode;

an I/F means that includes a power supply means for supplying electric power to an outside device in a non-contact manner and a communications means for receiving communication data from the outside device, the I/F means being controlled by the mode setting means; and
a switching means controlled by the mode controlled means for supplying electric power from a main power supply to the I/F means,
wherein when the mode setting means has set the energy saving mode, the mode setting means controls the switching means to be ON intermittently during a predetermined interval, and controls the I/F means to supply electric power to the outside device in the non-contact manner when the switching means is ON and to receive the communication data from the outside devices,
when the I/F means has received at least the portion of the communication data and only one bit is detected, located at a beginning of the communication data which is not in a complete form, the mode setting means switches from a continuous electric power supply to an intermittent power supply of an ON control which is conducted for a predetermined time needed to detect the communication data in the complete form, and determines whether the communication data includes a request for a return from the energy saving mode, and
wherein the ON control increases an average of electric power in the intermittent supply state by applying an increased electric power at time of the ON control.

40. An electronic device having an energy saving mode, comprising:
a mode setting means for setting any one of an ordinary mode and the energy saving mode;
an I/F means controlled by the mode setting means for supplying electric power to an outside device in a non-contact manner and for receiving communication data from the outside device; and
a switching means controlled by the mode controlled means for supplying electric power from a main power supply to the I/F means,
wherein when the mode setting means has set the energy saving mode, the mode setting means controls the switching means to be ON intermittently during a predetermined interval, and controls the I/F means to supply electric power to the outside device in the non-contact manner when the switching means is ON and to receive a portion of the communication data from the outside device, and
when the I/F means has received at least a portion communication data and only one bit is detected, located at a beginning of the communication data which is not in a complete form, the mode setting means switches from a continuous electric power supply to an intermittent power supply of an ON control which is conducted for a predetermined time needed to detect the communication data in the complete form, and determines whether the communication data indicates to return from the energy saving mode,
wherein the ON control increases an average of electric power in the intermittent supply state by applying an increased electric power at time of the ON control.

41. An electronic device having an energy saving mode, comprising:
a mode setting means for setting any one of an ordinary mode and the energy saving mode;
an I/F means that includes a power supply means for supplying electric power to an outside device in a non-contact manner and a communications means for receiving communication data from the outside device, the I/F means being controlled by the mode setting means; and
a switching means controlled by the mode controlled means for supplying electric power from a main power supply to the I/F means,
wherein when the mode setting means has set the energy saving mode, the mode setting means controls the switching means to be ON intermittently during a predetermined interval, and controls the I/F means to supply electric power to the outside device in the non-contact manner when the switching means is ON and to receive a portion of the communication data from the outside device, and
when the I/F circuit section has received at least a portion communication data and only one bit is detected, located at a beginning of the communication data which is not in a complete form, the mode setting means switches from a continuous electric power supply to an intermittent power supply of an ON control which is conducted for a predetermined time needed to detect the communication data in the complete form, and determines whether the communication data includes a request for a return from the energy saving mode,
wherein the ON control increases an average of electric power in the intermittent supply state by applying an increased electric power at time of the ON control.

42. A method of controlling an electronic device, the electronic device having an energy saving mode and comprising:
a mode setting means for setting any one of an ordinary mode and the energy saving mode;
an I/F means controlled by the mode setting means for supplying electric power to an outside device in a non-contact manner and for receiving communication data from the outside; and
a switching means controlled by the mode controlled means for supplying electric power from a main power supply to the I/F means, the method comprising:
setting the energy saving mode by the mode setting means;
controlling the switching means by the mode setting means to be ON intermittently during a predetermined interval; and
controlling the I/F means by the mode setting means to supply electric power to the outside device in the non-contact manner, when the switching means is ON and to receive the communication data from the outside devices,
when the I/F means has received at least the portion of the communication data and only one bit is detected, located at a beginning of the communication data which is not in a complete form, the mode setting means switches from a continuous electric power supply to an intermittent power supply of an ON control which is conducted for a predetermined time needed to detect the communication data in the complete form, and determines whether the communication data includes a request for a return from the energy saving mode, and
wherein the ON control increases an average of electric power in the intermittent supply state by applying an increased electric power at time of the ON control.

43. A method of controlling an electronic device, the electronic device having an energy saving mode and comprising:
a mode setting means for setting any one of an ordinary mode and the energy saving mode;
an I/F means that includes a power supply means for supplying electric power to an outside device in a non-contact manner and a communications means for receiving communication data from the outside device, the I/F means being controlled by the mode setting means; and a switching means controlled by the mode controlled means for supplying electric power from a main power supply to the I/F means, the method comprising:

setting the energy saving mode by the mode setting means;

controlling the switching means by the mode setting means to be ON intermittently during a predetermined interval; and controlling the I/F means by the mode setting means to supply electric power to the outside device in the non-contact manner when the switching means is ON and to receive the communication data from the outside device, when the I/F means has received at least the portion of the communication data and only one bit is detected, located at a beginning of the communication data which is not in a complete form, the mode setting means switches from a continuous electric power supply to an intermittent power supply of an ON control which is conducted for a predetermined time needed to detect the communication data in the complete form, and determines whether the communication data includes a request for a return from the energy saving mode, and wherein the ON control increases an average of electric power in the intermittent supply state by applying an increased electric power at time of the ON control.

44. A method of controlling an electronic device, the electronic device having an energy saving mode and comprising:

a mode setting means for setting any one of an ordinary mode and the energy saving mode;

an I/F means controlled by the mode setting means for supplying electric power to an outside device in a non-contact manner and for receiving communication data from the outside device; and a switching means controlled by the mode controlled means for supplying electric power from a main power supply to the I/F means, the method comprising:

setting the energy saving mode by the mode setting means;

controlling the switching means by the mode setting means to be ON intermittently during a predetermined interval;

controlling the I/F means by the mode setting means to supply electric power to the outside device in the non-contact manner, when the switching means is ON and to receive the part of the communication data from the outside device;

receiving the communication data by the I/F means; and controlling the switching means by the mode setting means to be ON to increase an average electric power supplied to the outside device in the non-contact manner, and determining whether the communication data indicates to return from the energy saving mode, wherein the controlling the switching means to be ON increases the average of electric power in the intermittent supply state by applying an increased electric power at time of the ON controlling.

45. A method of controlling an electronic device, the electronic device having an energy saving mode comprising:

a mode setting means for setting any one of an ordinary mode and the energy saving mode;

an I/F means that includes a power supply means for supplying electric power to an outside device in a non-contact manner and a communications means for receiving communication data from the outside device, the I/F means being controlled by the mode setting means; and a switching means controlled by the mode controlled means for supplying electric power from a main power supply to the I/F means, the method comprising setting the energy saving mode by the mode setting means;

controlling the switching means to be ON intermittently during a predetermined interval by the mode setting means;

controlling the I/F means by the mode setting means to supply electric power to the outside device when the switching means is ON and to receive a portion of the communication data from the outside device;

receiving the communication data by the I/F means; and controlling the switching means by the mode setting means to be ON to increase an average electric power supplied to the outside device, and determining whether the communication data indicates to return from the energy saving mode, wherein the controlling the switching means to be ON increases the average of electric power in the intermittent supply state by applying an increased electric power at time of the ON controlling.

* * * * *